US011199962B2

(12) United States Patent
Venis

(10) Patent No.: US 11,199,962 B2
(45) Date of Patent: Dec. 14, 2021

(54) FREEHAND MEMO IMAGE AUTHENTICATION

(71) Applicant: Shane Venis, Edmond, OK (US)

(72) Inventor: Shane Venis, Edmond, OK (US)

(73) Assignee: Shane Venis, Fort Worth, TX (US)

( * ) Notice: Subject to any disclaimer, the term of this patent is extended or adjusted under 35 U.S.C. 154(b) by 430 days.

(21) Appl. No.: 15/140,083

(22) Filed: Apr. 27, 2016

(65) Prior Publication Data

US 2016/0313889 A1 Oct. 27, 2016

Related U.S. Application Data

(60) Provisional application No. 62/153,037, filed on Apr. 27, 2015.

(51) Int. Cl.
*G06F 3/0488* (2013.01)
*G06F 21/00* (2013.01)
(Continued)

(52) U.S. Cl.
CPC .......... *G06F 3/04883* (2013.01); *G06F 21/00* (2013.01); *G06F 21/64* (2013.01);
(Continued)

(58) Field of Classification Search
CPC ...... G06F 3/04883; G06F 21/00; G06F 21/64; G06F 3/041; G06F 17/243; G06F 21/44; G06F 3/0484; G06Q 30/02; G06Q 30/0241; H04N 2201/0077; H04N 7/147; H04N 7/141; H04N 1/32112; H04N 1/00347; F16M 11/046; G01C 21/3608
See application file for complete search history.

(56) References Cited

U.S. PATENT DOCUMENTS 8,849,268 B2 9/2014 Cho et al.
8,866,934 B2 10/2014 Matsushima
(Continued)

OTHER PUBLICATIONS

TAPSNAP.net website, https://tapsnap.net/, Apr. 27, 2015; (accessed from https://web.archive.org/web/20150427015938/http://tapsnap.net/ on Apr. 27, 2016).

*Primary Examiner* — Richard J Hong
(74) *Attorney, Agent, or Firm* — Total Awareness Consulting Services; Robert Winslow

(57) ABSTRACT

A memo and photo authenticating system comprises a multiuser touch input device configured for input by a plurality of users. The memo and photo authenticating system comprises at least one camera communicatively coupled to the multiuser touch input device. The memo and photo authenticating system comprises at least one processor. The memo and photo authenticating system comprises a non-transitory tangible machine readable medium. The non-transitory tangible machine readable medium comprises instructions configured to cause the at least one processor to capture a freehand memo employing the multiuser touch input device, store the freehand memo in a data storage device, capture at least one image of at least one user employing the at least one camera, store the at least one image in the data storage device, and associate the freehand memo with the at least one image of the at least one user in the data storage device.

23 Claims, 14 Drawing Sheets

(51) Int. Cl.
*G06Q 30/02* (2012.01)
*G06F 21/64* (2013.01)
*G06Q 30/06* (2012.01)
*H04N 1/32* (2006.01)
*G06Q 10/10* (2012.01)

(52) U.S. Cl.
CPC ......... *G06Q 10/10* (2013.01); *G06Q 30/0241* (2013.01); *G06Q 30/06* (2013.01); *H04N 1/32128* (2013.01); *H04N 2201/3233* (2013.01); *H04N 2201/3243* (2013.01); *H04N 2201/3245* (2013.01); *H04N 2201/3269* (2013.01); *H04N 2201/3273* (2013.01)

(56) References Cited

U.S. PATENT DOCUMENTS

| | | | |
|---|---|---|---|
| 2005/0078190 A1* | 4/2005 | Bloom | H04N 1/32112 348/207.99 |
| 2009/0154889 A1* | 6/2009 | Ryckman | G06Q 30/02 386/326 |
| 2010/0004010 A1 | 1/2010 | Shin et al. | |
| 2010/0177019 A1* | 7/2010 | Jeong | H04N 1/00347 345/1.3 |
| 2011/0234779 A1 | 9/2011 | Weisberg | |
| 2012/0229589 A1* | 9/2012 | Barrus | H04N 7/147 348/14.08 |
| 2013/0117665 A1* | 5/2013 | Tagliaferri | G06F 17/243 715/255 |
| 2013/0254284 A1* | 9/2013 | Dougherty | G06F 21/00 709/204 |
| 2013/0263002 A1 | 10/2013 | Park | |
| 2014/0007001 A1* | 1/2014 | Li | G06F 3/0484 715/780 |
| 2014/0007002 A1* | 1/2014 | Chang | G06F 3/04883 715/780 |
| 2014/0201637 A1 | 7/2014 | Na et al. | |
| 2015/0001355 A1* | 1/2015 | Huang | F16M 11/046 248/123.11 |
| 2015/0019961 A1 | 1/2015 | Won | |
| 2015/0244976 A1* | 8/2015 | Chen | H04N 7/141 348/14.07 |
| 2015/0331664 A1* | 11/2015 | Osawa | G01C 21/3608 704/275 |
| 2016/0110531 A1* | 4/2016 | Ohbitsu | G06F 21/44 726/7 |
| 2016/0179335 A1* | 6/2016 | Thompson | G06F 3/041 345/173 |

* cited by examiner

FREEHAND MEMO IMAGE AUTHENTICATION

CROSS-REFERENCE TO RELATED APPLICATIONS

This application claims the benefit of U.S. Provisional application Ser. No. 62/153,037, filed Apr. 27, 2015, which is hereby incorporated by reference in its entirety.

BACKGROUND

Freehand memos are either not authenticated, are written on paper, or alter a digital image. What is needed is a system, device, and/or method to authenticate a digital freehand memo with a digital image.

DETAILED DESCRIPTION OF EMBODIMENTS

Embodiments authenticate images of freehand memos. Embodiments are intended to advance the technical field of memo authentication. According to some of the various embodiments, an imaging camera may capture a photo of a person or a group of people who generated a freehand memo on a touch input device or through a plurality of gestures captured, at least in part, by the imaging camera. The captured photo may be associated with the freehand memo. The captured photo may be employed to authenticate the originator(s) of the freehand memo.

According to some of the various embodiments, a purchase may be made by a person or a group of people who generated a freehand memo. A purchase confirmation may be associated with the freehand memo. The purchase confirmation may be employed to authenticate the originator(s) of the freehand memo.

Figure 1:
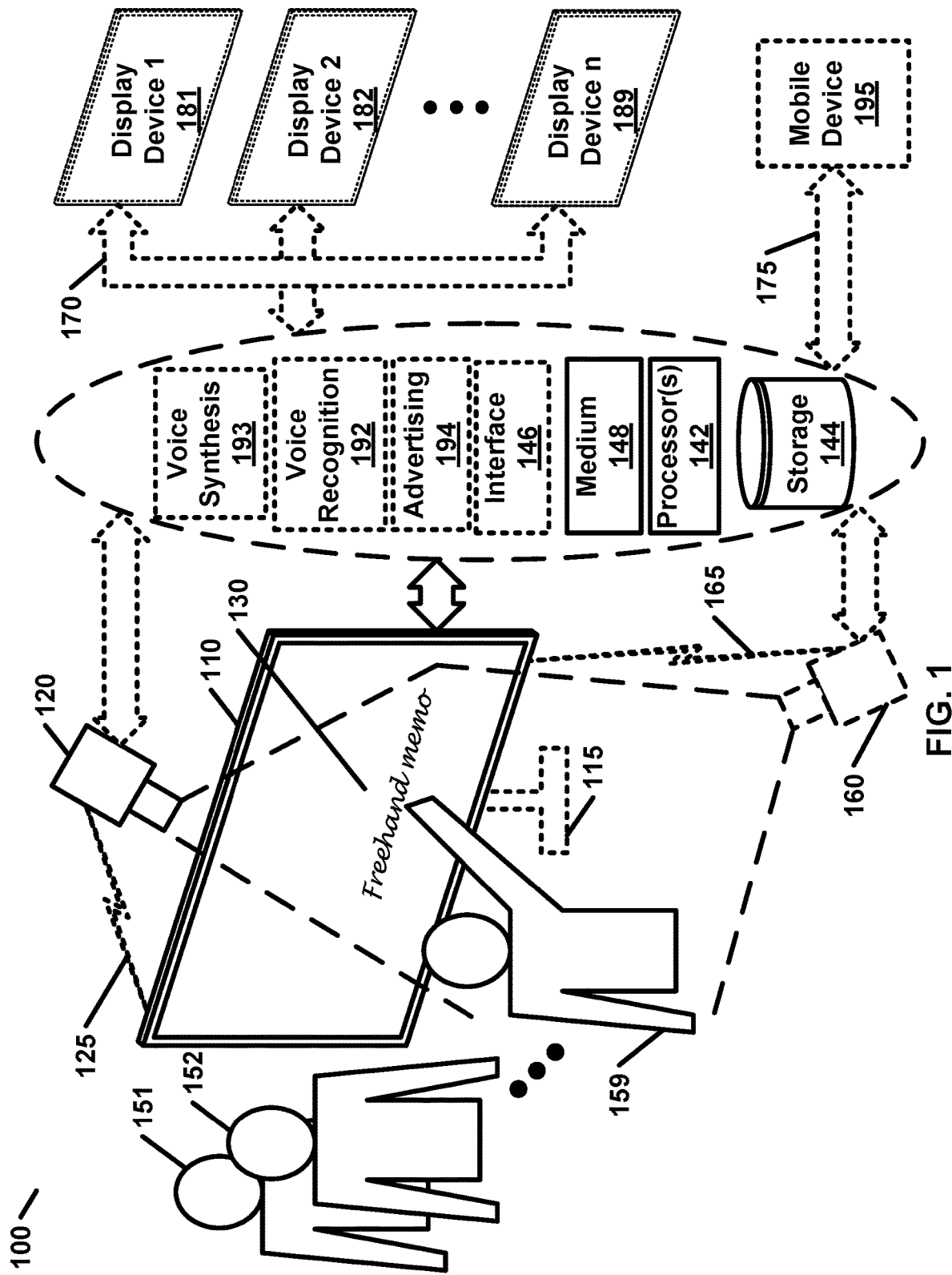
FIG. 1 is an example block diagram showing elements of a memo and photo authenticating system as per an aspect of some of the various embodiments.

FIG. 1 is an example block diagram showing elements of a memo and photo authenticating system 100 comprising a multiuser touch input device 110, at least one camera 120, and at least one processor 142. The multiuser touch input device 110 may be configured for input by a plurality of users (e.g. 151, 152 . . . 159). The multiuser touch input device 110 may comprise a touch screen display, a portable touch screen display, a touch overlay, combinations thereof, and/or the like. The memo and photo authenticating system 100 may comprise a mount 115. The mount 115 may be configurable to position the multiuser touch input device 110 for multiple user viewing. For example, the multiuser touch input device 110 may be mounted at a height to enable viewing by users such as, for example, standing users, seated users, walking users, combinations thereof, and/or the like. In this example, the multiuser touch input device 110 may be mounted adjacent to open space large enough to support a plurality of users (e.g. 151, 152 . . . 159). According to some of the various embodiments, the plurality of users (e.g. 151, 152 . . . 159) may be able to choose at least one of a possible plurality of multiuser touch input device(s) (e.g. 110) and/or display device(s) (e.g. 181, 182 . . . 189) to view.

According to some of the various embodiments, a portable touch screen display may comprise a monitor, a television, an E-Ink display device, a tablet, combinations thereof, and/or the like. The portable touch screen display may be configured for display and input. The portable touch screen display may be mounted, for example, on a wheeled cart, on a portable stand, to a swing mount, to a fixed mount, combinations thereof, and/or the like. The portable touch screen display may be configured to be packable in a case configured for transportation and/or storage.

According to some of the various embodiments, a touch overlay may be configured for a monitor, a television, a tablet, combinations thereof, and/or the like. The touch overlay may be configured for input. An example of the touch overlay is a Samsung Touch Overlay.

According to some of the various embodiments, at least one camera 120 may be communicatively coupled to the multiuser touch input device 110. At least one camera 120 may comprise a connection 125 comprising wired and/or wireless communication. Examples of a wired connection may include HDMI, DVI, Display Port, combinations thereof, and/or the like. Examples may include 10baseT, 100baseT, coaxial, fiber, combinations thereof, and/or the like. The wired connection may support Ethernet, for example, configured to be at least part of a MAN, WAN, LAN, the Internet, combinations thereof, and/or the like. Examples of a wireless connection may include Wi-Fi, WiMAX, LTE, Bluetooth, a TV adapter, combinations thereof, and/or the like. The TV adapter may be configured to receive streaming media from the at least one camera 120. Examples of TV adapters may include Intel Wireless Display (WiDi), Apple AirPlay, WiGig, combinations thereof, and/or the like. At least one camera 120 may be integrated with the multiuser touch input device 110, a display device, combinations thereof, and/or the like. An integrated camera may comprise a built in webcam, for example. According to some of the various embodiments, the at least one camera 120 may be configured to be mounted external and touching the multiuser touch input device 110. For example, the camera may sit on top of the multiuser touch input device (e.g. an Xbox 360) or hang on the top of the multiuser touch input device (e.g. a portable webcam). According to some of the various embodiments, the at least one camera 120 may be configured to be mounted external and distant to the multiuser touch input device 110. For example, the at least one camera may be mounted on a separate tripod.

According to some of the various embodiments, a memo and photo authenticating system 100 may comprise a non-transitory tangible machine readable medium 148. The non-transitory tangible machine readable medium 148 may comprise, for example, a memory stick, a flash drive, a networked drive, combinations thereof, and/or the like. The non-transitory tangible machine readable medium 148 may comprise an external connector. The non-transitory tangible machine readable medium 148 may be built in to the multiuser touch input device 110. At least one processor 142 may be collocated with the non-transitory tangible machine readable medium 148. A data storage device 144 may comprise at least part of the non-transitory tangible machine readable medium 148. The data storage device 144 may be collocated with a central computing device. The data storage device 144 may be distributed among a plurality of central computing devices. At least one processor 142 may be configured to communicate with the central computing device(s). Communication between the at least one processor 142 and the central computing device(s) may employ a communications interface 146. The communications interface 146 may be collocated with the non-transitory tangible machine readable medium 148.

According to some of the various embodiments, a memo and photo authenticating system 100 may comprise at least one remote camera 160. At least one remote camera 160 may be mounted to view the multiuser touch input device 110. At least one remote camera 160 may be communicatively coupled to the multiuser touch input device 110. At least one remote camera 160 may comprise a connection 165 comprising wired and/or wireless communication. Although the current disclosure discusses camera 120 and/or 160 as a photo imaging device, according to some of the various embodiments, camera 120 and/or 160 and/or the like may be an imaging device that captures images other than photos, such as a video camera, a light field camera, an infrared sensor, combinations thereof, and/or the like.

According to some of the various embodiments, a non-transitory tangible machine readable medium 148 may comprise instructions configured to cause the at least one processor 142 to capture a freehand memo 130. The freehand memo 130 may be captured employing the multiuser touch input device 110. The instructions may be configured to cause the at least one processor 142 to store the freehand memo 130 in the data storage device 144. The freehand memo 130 may comprise a screenshot from the multiuser touch input device 110. The multiuser touch input device 110 may be configured to trace and store hand, finger, and/or stylus movements by the at least one user (e.g. 159). The freehand memo 130 may comprise a freehand drawing. The freehand memo 130 may be stored as an image, photo, drawing, combinations thereof, and/or the like.

According to some of the various embodiments, a freehand memo 130 may be addressed to an honoree, a host of a party or event, a bride, a groom, a retiree, an employee, a soon to be retired employee, a guest of honor, a celebrity, combinations thereof, and/or the like. The guest of honor may comprise a reward recipient, an ordained minister, an eagle scout, a graduate, combinations thereof, and/or the like. The freehand memo 130 may be addressed to a patient. The patient may be located in a hospital, a clinic, a rehabilitation center, combinations thereof, and/or the like. The freehand memo 130 may be addressed to a donor (e.g. donor of goods or money to charity), a volunteer, an organ donor, combinations thereof, and/or the like. The freehand memo 130 may be addressed to an auction winner, a member of a military unit, a competitor, a contestant, combinations thereof, and/or the like. The competitor may comprise, for example, a winner of a competition, a winner of a special achievement such as hole in one while playing golf, a record holder, combinations thereof, and/or the like. The contestant may comprise, for example, a contestant in a contest, beauty pageant, TV series, combinations thereof, and/or the like. The freehand memo 130 may be addressed to an entity such as, for example, a golf club, a banquet facility, a venue, and/or a hotel. The freehand memo 130 may be addressed to a vendor such as, for example, a street vendor or a vendor at a trade show or festival. The freehand memo 130 may be written, for example, by a guest at a party or event, a friend of the honoree or guest of honor, a colleague or employer of a retiree or a soon to be retired employee, a fan of a celebrity, combinations thereof, and/or the like. The freehand memo 130 may be written, for example, by a coach of a competitor, a fellow competitor, a fellow contestant, combinations thereof, and/or the like. The freehand memo 130 may be written by, for example, a friend or family member of a patient, a military unit member, a graduate, combinations thereof, and/or the like.

According to some of the various embodiments, instructions may be configured to cause at least one processor 142 to capture at least one image of at least one user (e.g. 159). At least one image may be captured employing the at least one camera 120. At least one image may be captured before, during, or after a freehand memo 130 is written by the at least one user (e.g. 159). At least one image may comprise at least one video. The instructions may be configured to cause the at least one processor 142 to store the at least one image in the data storage device 144.

According to some of the various embodiments, the instructions may be configured to cause at least one processor 142 to associate a freehand memo 130 with at least one image of the at least one user (e.g. 159) in data storage device 144. For the purpose of the various embodiments, the term "associate" means to connect or bring into relation. For example, associating the freehand memo 130 with the at least one image may comprise a link between files, a file pointer to at least one of the files, a database comprising a plurality of links or pointers, combinations thereof, and/or the like. In another example, associating the freehand memo 130 with the at least one image may comprise merging at least two files together. In this example, a merged file may comprise at least one merged image. At least one of the at least one merged image may be configured to present the freehand memo 130 side by side horizontally and/or vertically with at least one of the at least one image.

According to some of the various embodiments, the instructions may be configured to cause at least one processor 142 to capture at least one remote image of at least one user (e.g. 159). At least one remote image may be captured employing at least one remote camera 160. At least one remote image may be captured before, during, or after a freehand memo 130 is written by the at least one user (e.g. 159). At least one remote image may comprise at least one remote video. The instructions may be configured to cause at least one processor 142 to store the at least one remote image in data storage device 144. The instructions may be configured to cause at least one processor 142 to associate the at least one remote image with the freehand memo 130 in the data storage device 144.

According to some of the various embodiments, at least one of the display device(s) (e.g. 181, 182 . . . 189) may be configured to present the freehand memo 130, the at least one image, the at least one remote image, combinations thereof, and/or the like. At least one of the display device(s) (e.g. 181, 182 . . . 189) may be configured as a multiuser touch input device 110. At least one of the display device(s) (e.g. 181, 182 . . . 189) may be configured to present images captured by, for example, an event photographer. According to some of the various embodiments, at least one of the display device(s) (e.g. 181, 182 . . . 189) may be configured to present images and/or freehand memos captured by at least one remote guest through employment of at least one mobile device 195. The images and/or freehand memos captured by the event photographer and/or at least one remote guest may be presented with graphical elements distinct from freehand memo 130 and the at least one image captured by the multiuser touch input device 110. For example, freehand memos captured by the at least one remote guest may comprise a border, a distinct border type, a distinct border color, a user name, combinations thereof, and/or the like.

According to some of the various embodiments, multiuser touch input device 110 and/or at least one of the display device(s) (e.g. 181, 182 . . . 189) may be configured to require an event code. The event code may be required to enable capture of the freehand memo 130 and/or capture of the at least one image. The event code may be required to enable presentation of the freehand memo 130, the at least one image, the at least one remote image, combinations thereof, and/or the like. The multiuser touch input device 110 and/or at least one of the display device(s) (e.g. 181, 182 . . . 189) may be configured to present a keyboard for input of the event code, login information for the at least one user (e.g. 159), contact information (e.g. a mobile phone number and/or an email address) of the at least one user (e.g. 159), contact information for at least one invitation, combinations thereof, and/or the like. The multiuser touch input device 110 and/or at least one of the display device(s) (e.g. 181, 182 . . . 189) may be configured to enable access to a user account. The user account may be employed to access stored freehand memos and/or stored images from the data storage device 144. The user account may be employed to create, modify, and/or communicate an event. The event may be assigned the event code. The event may be a private event or a public event. Public events may be associated with public event codes. Public event codes may be broadcasted without a need for an invitation. The user account may be employed to communicate invitations comprising the event code to at least one remote guest. The user account may be associated with a user, a plurality of users, an entity, a corporation, a company, combinations thereof, and/or the like.

According to some of the various embodiments, a multiuser touch input device 110 and/or at least one of the display device(s) (e.g. 181, 182 . . . 189) may be configured to restrict user access to the operating system and/or features other than the capturing of freehand memos, the capturing of images, the presentation of images, combinations thereof, and/or the like. The multiuser touch input device 110 and/or at least one of the display device(s) (e.g. 181, 182 . . . 189) may be configured to accept at least one biometric, at least one gesture, at least one voice command, combinations thereof, and/or the like from the at least one user (e.g. 159).

According to some of the various embodiments, a memo and photo authenticating system 100 may comprise a communications interface 146. The communications interface 146 may be configured to communicate over network 170 with at least a part of a distribution system. The distribution system may comprise the plurality of display devices (181, 182 . . . 189). The communications interface 146 may be configured to communicate over network 175 with at least one mobile device 195. The memo and photo authenticating system 100 may comprise a voice recognition module 192. The voice recognition module 192 may be configured to accept at least one voice command from the at least one user (e.g. 159). The voice recognition module 192 may be collocated with the non-transitory tangible machine readable medium 148. The memo and photo authenticating system 100 may comprise a voice synthesis module 193. The voice synthesis module 193 may be configured to convert at least one instruction into sound. The voice synthesis module 193 may be collocated with the non-transitory tangible machine readable medium 148. The memo and photo authenticating system 100 may comprise an advertisement module 194. The advertisement module 194 may be configured to display at least one advertisement on one or more of displays (e.g. 181, 182 . . . 189) and/or the display portion of the multiuser touch input device 110. The advertisement module 194 may be collocated with the non-transitory tangible machine readable medium 148.

Figure 2:
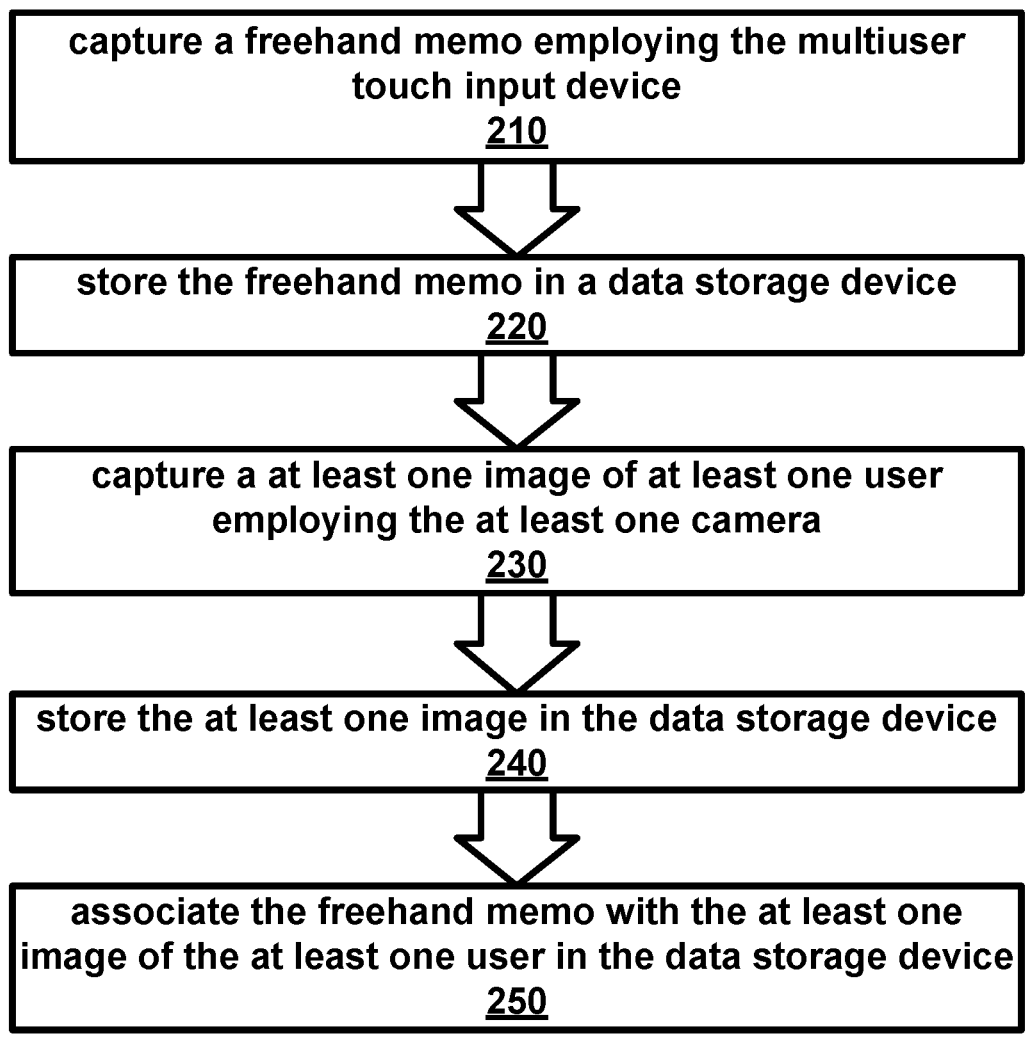
FIG. 2 is an example flow diagram of memo and photo authenticating as per an aspect of an embodiment.

FIG. 2 is an example flow diagram of memo and photo authenticating as per aspects of various embodiments. At 210, instructions may be configured to cause at least one processor (e.g. 142) to capture a freehand memo (e.g. 130) employing a multiuser touch input device (e.g. 110). At 220, instructions may be configured to cause at least one processor (e.g. 142) to store the freehand memo (e.g. 130) in a data storage device (e.g. 144). At 230, instructions may be configured to cause at least one processor (e.g. 142) to capture at least one image of at least one user (e.g. 159) employing the at least one camera (e.g. 120). At 240, instructions may be configured to cause at least one processor (e.g. 142) to store the at least one image in the data storage device (e.g. 144). At 250, instructions may be configured to cause at least one processor (e.g. 142) to associate the freehand memo (e.g. 130) with the at least one image of the at least one user (e.g. 159) in the data storage device (e.g. 144).

Figure 3:
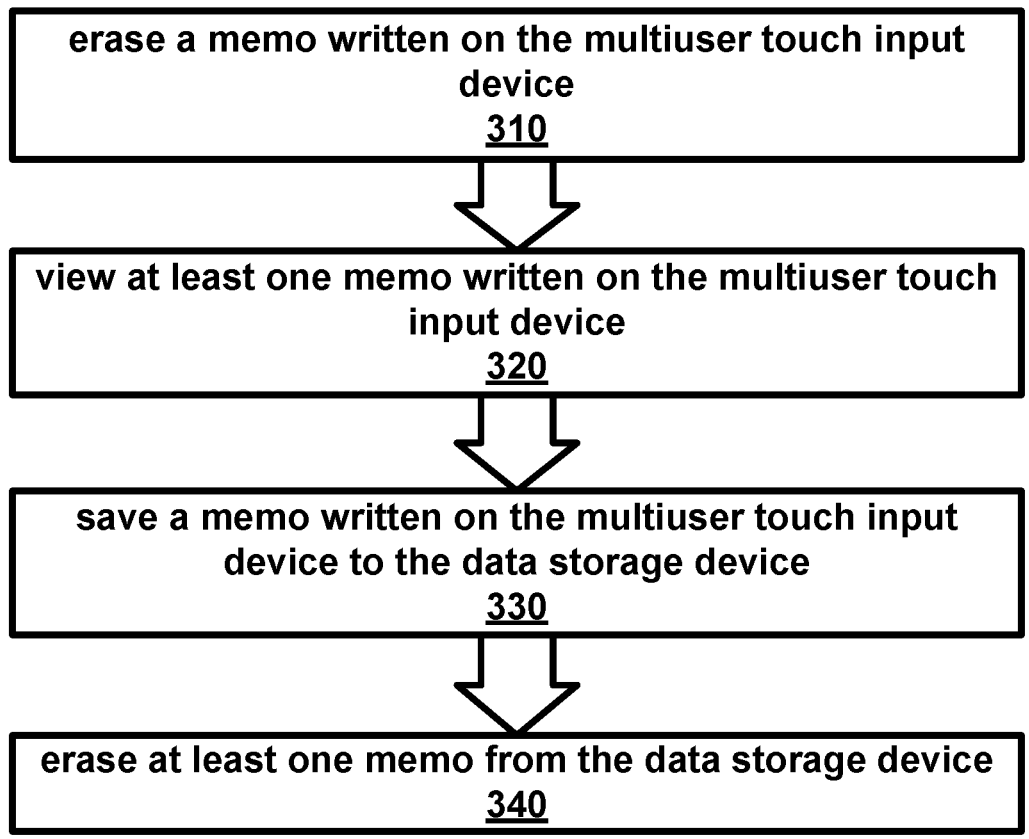
FIG. 3 is an example flow diagram of memo and photo authenticating as per an aspect of some of the various embodiments.

FIG. 3 is an example flow diagram of memo and photo authenticating as per aspects of various embodiments. At 310, instructions may be configured to cause at least one processor (e.g. 142) to prompt (and/or respond to a user command from) at least one of a plurality of users (e.g. 151, 152 . . . 159) to erase a freehand memo written on a multiuser touch input device (e.g. 110). At 320, instructions may be configured to cause at least one processor (e.g. 142) to prompt (and/or respond to a user command from) at least one of the plurality of users (e.g. 151, 152 . . . 159) to view at least one freehand memo (e.g. 130) written on the multiuser touch input device (e.g. 110). At 330, instructions may be configured to cause at least one processor (e.g. 142) to prompt (and/or respond to a user command from) at least one of the plurality of users (e.g. 151, 152 . . . 159) to save a freehand memo (e.g. 130) written on the multiuser touch input device (e.g. 110) to the data storage device (e.g. 144). At 340, instructions may be configured to cause at least one processor (e.g. 142) to prompt (and/or respond to a user command from) at least one of the plurality of users (e.g. 151, 152 . . . 159) to erase at least one freehand memo (e.g. 130) from the data storage device (e.g. 144). The prompt may be configured to direct at least one user (e.g. 159) on how to write a freehand memo. The prompt may comprise, for example, a message from the honoree, a picture of the honoree, a video from the honoree, combinations thereof, and/or the like.

Figure 4:
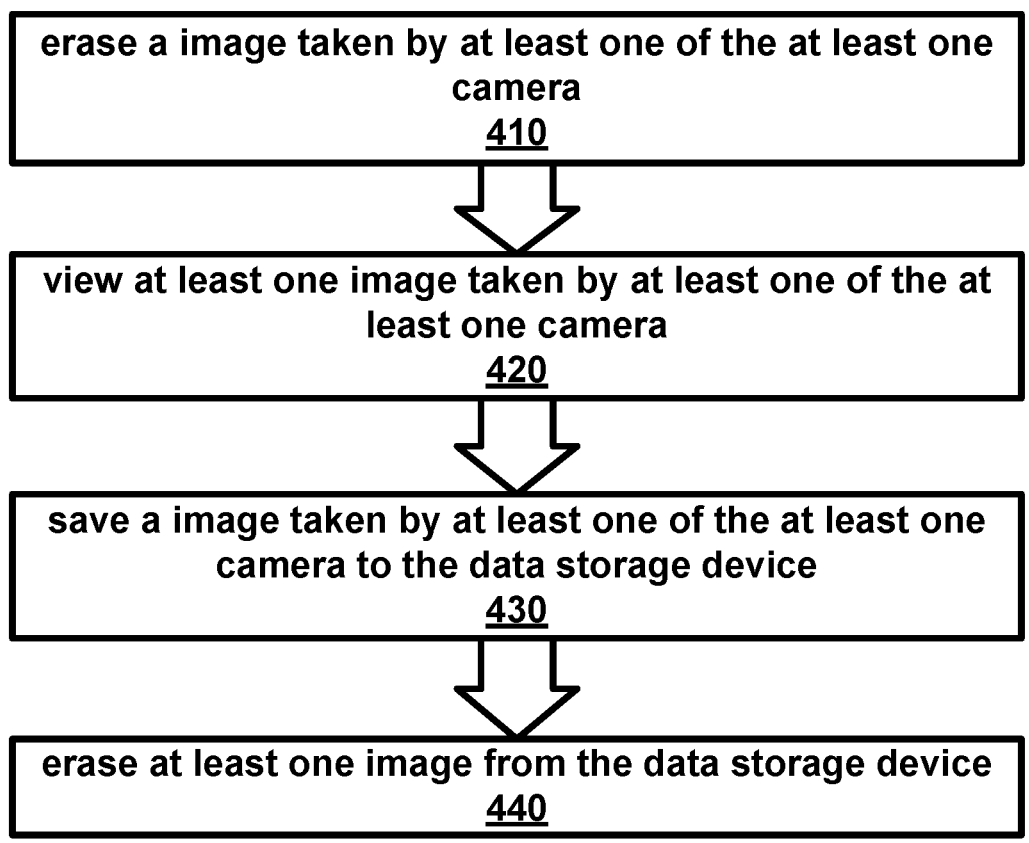
FIG. 4 is an example flow diagram of memo and photo authenticating as per an aspect of some of the various embodiments.

FIG. 4 is an example flow diagram of memo and photo authenticating as per aspects of various embodiments. At 410, instructions may be configured to cause at least one processor (e.g. 142) to prompt (and/or respond to a user command from) at least one of the plurality of users (e.g. 151, 152 . . . 159) to erase an image taken by at least one of the at least one camera (e.g. 120, 160). At 420, instructions may be configured to cause at least one processor (e.g. 142) to prompt (and/or respond to a user command from) at least one of the plurality of users (e.g. 151, 152 . . . 159) to view at least one image taken by at least one of the at least one camera (e.g. 120, 160). At 430, instructions may be configured to cause at least one processor (e.g. 142) to prompt (and/or respond to a user command from) at least one of the plurality of users (e.g. 151, 152 . . . 159) to save an image taken by at least one of the at least one camera (e.g. 120, 160) to the data storage device (e.g. 144). At 440, instructions may be configured to cause at least one processor (e.g. 142) to prompt (and/or respond to a user command from) at least one of the plurality of users (e.g. 151, 152 . . . 159) to erase at least one image from the data storage device (e.g. 144).

According to some of the various embodiments, the instructions may be configured to cause at least one processor (e.g. 142) to prompt the at least one user (e.g. 159) to prepare themselves for an image type. The image type may comprise a sequence of images, a full body image, a close up image, a funny image, combinations thereof, and/or the like. The instructions may be configured to cause at least one processor (e.g. 142) to accept pinch and zoom commands from the at least one user (e.g. 159). The pinch and zoom commands may enable the at least one camera (e.g. 120) to zoom in/out. The instructions may be configured to cause at least one processor (e.g. 142) to display a countdown timer for an image capture. The instructions may be configured to cause at least one processor (e.g. 142) to accept vocal commands employing the voice recognition module (e.g. 192). The instructions may be configured to cause at least one processor (e.g. 142) to initiate an image capture in response to a user command. The instructions may be configured to cause at least one processor (e.g. 142) to present at least one confirmation message. At least one confirmation message may comprise an image, a video, audio, combinations thereof, and/or the like. For example, the confirmation message may comprise a thank you message written and/or spoken by the honoree. According to some of the various embodiments, the confirmation message may be pre-configured, selectable from a plurality of confirmation messages, customized for a party or event, combinations thereof, and/or the like.

According to some of the various embodiments, the instructions may be configured to cause at least one processor (e.g. 142) to produce a digital photo album comprising the freehand memo (e.g. 130) and the associated at least one image. The digital photo album may comprise one image superimposed on another image, an image overlay, a presentation of images side by side horizontally, a presentation of images stacked vertically, combinations thereof, and/or the like.

Figure 5:
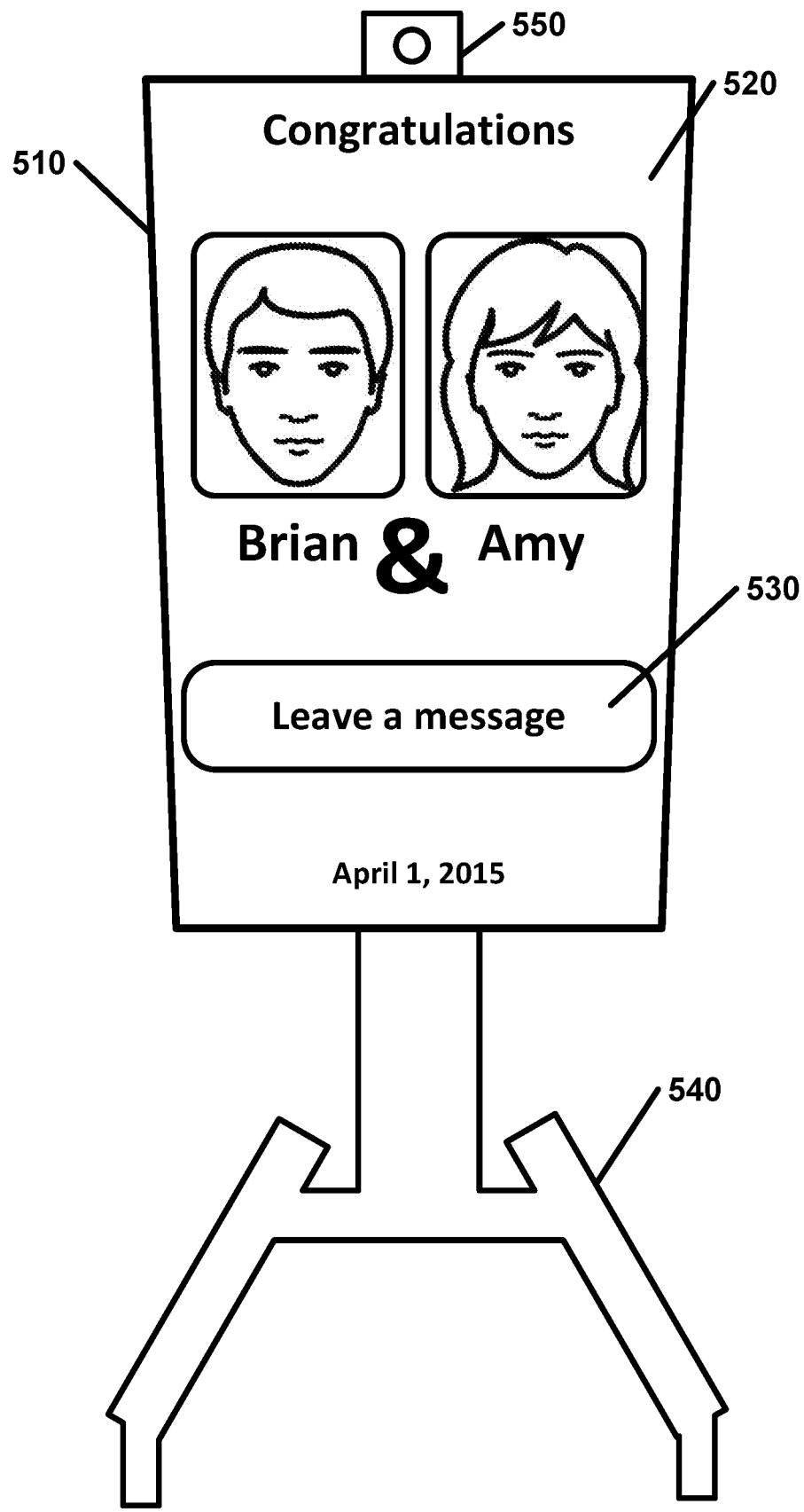
FIG. 5 is an example diagram showing various elements of a memo and photo authenticating system as per an aspect of some of the various embodiments.

FIG. 5 is an example diagram showing various elements of a memo and photo authenticating system comprising a multiuser touch input device 510, at least one camera 550, and a mount 540. In this example, the multiuser touch input device 510 is combined with a display device presenting an image 520 of two honorees and a prompt 530 configured to direct at least one user to write a freehand memo.

Figure 6:
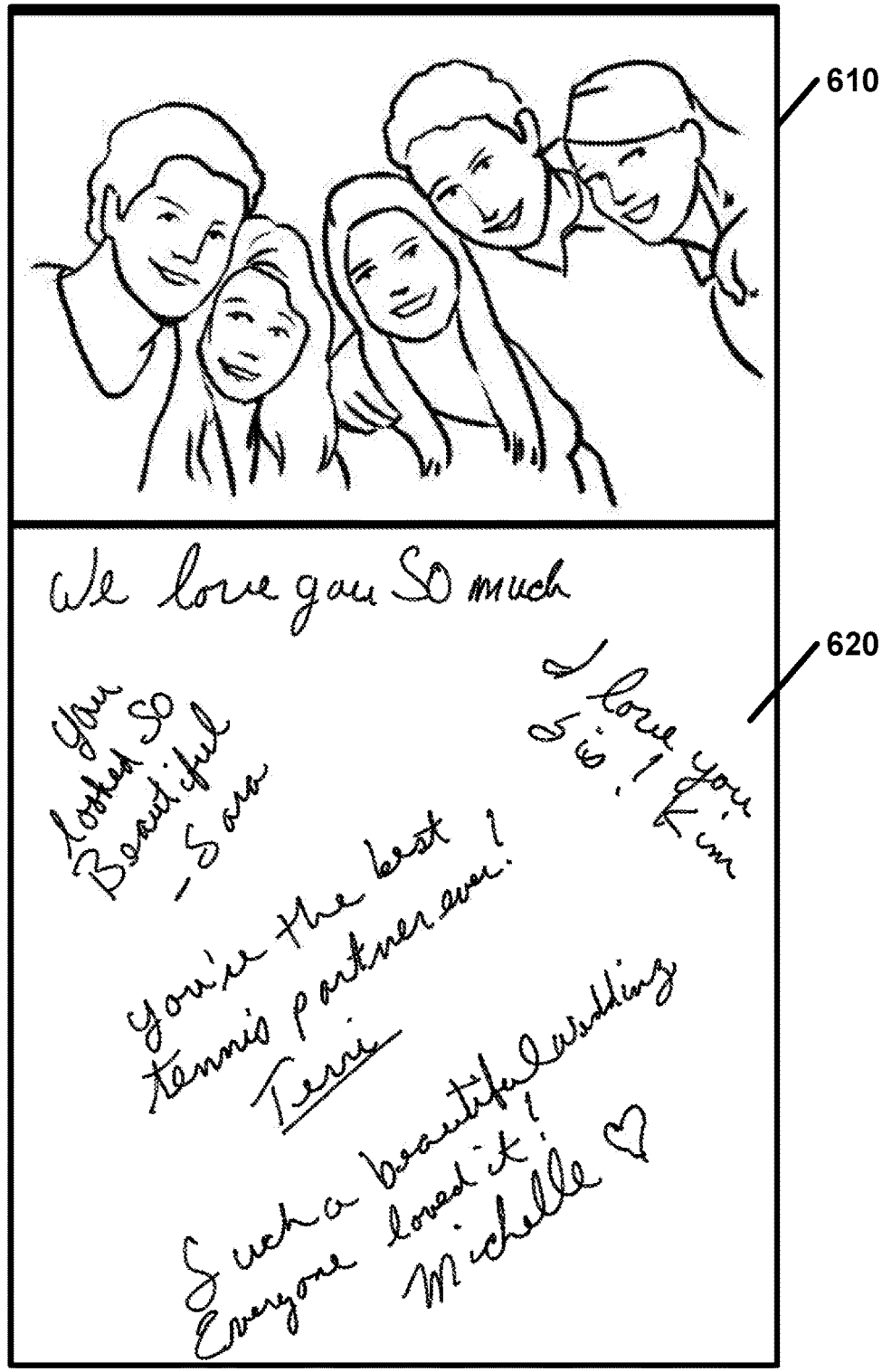
FIG. 6 is an example diagram of a freehand memo authenticated with an image as per an aspect of some of the various embodiments.

FIG. 6 is an example diagram of a freehand memo authenticated with an image 600 comprising one of at least one image 610 of a plurality of users and a freehand memo 620 associated with the at least one image 610. This freehand memo authenticated with an image 600 is an example of a group of friends who may have viewed the image 520 on a multiuser display device and acted together on the prompt 530 to leave freehand memo 620.

Figure 7:
FIG. 7 is an example diagram of a freehand memo authenticated with an image as per an aspect of some of the various embodiments.

FIG. 7 is an example diagram of a freehand memo authenticated with an image 700 comprising one of at least one image 710 of at least one user and a freehand memo 720 associated with the at least one image 710. This freehand memo authenticated with an image 700 is yet another example of a young person who may have viewed the image 520 on a multiuser display and acted independently (or with help of an older person who may also have viewed the image 520 on a multiuser display device) on the prompt 530 to leave freehand memo 720.

According to some of the various embodiments, a memo and photo authenticating method may comprise capturing a freehand memo (e.g. 130) employing a multiuser touch input device (e.g. 110). The memo and photo authenticating method may comprise storing the freehand memo (e.g. 130) employing at least one processor (e.g. 142). The freehand memo (e.g. 130) may be stored in a data storage device (e.g. 144). The memo and photo authenticating method may comprise capturing at least one image of at least one user (e.g. 159) employing at least one camera (e.g. 120). The memo and photo authenticating method may comprise storing at least one image in the data storage device (e.g. 144). The memo and photo authenticating method may comprise associating the freehand memo (e.g. 130) with at least one image of the at least one user (e.g. 159) in the data storage device (e.g. 144).

According to some of the various embodiments, the memo and photo authenticating method may comprise capturing at least one remote image of the least one user (e.g. 159) employing at least one remote camera (e.g. 160). The memo and photo authenticating method may comprise storing at least one remote image in the data storage device (e.g. 144). The memo and photo authenticating method may comprise associating at least one remote image with the freehand memo (e.g. 130) in the data storage device.

According to some of the various embodiments, the memo and photo authenticating method may comprise prompting (and/or responding to a user command from) at least one of a plurality of users (e.g. 151, 152 . . . 159) to erase a freehand memo (e.g. 130) written on the multiuser touch input device (e.g. 110). The memo and photo authenticating method may comprise prompting (and/or responding to a user command from) at least one of a plurality of users (e.g. 151, 152 . . . 159) to view at least one freehand memo (e.g. 130) written on the multiuser touch input device (e.g. 110). The memo and photo authenticating method may comprise prompting (and/or responding to a user command from) at least one of a plurality of users (e.g. 151, 152 . . .

159) to save a freehand memo (e.g. 130) written on the multiuser touch input device (e.g. 110) to a data storage device (e.g. 144). The memo and photo authenticating method may comprise prompting (and/or responding to a user command from) at least one of a plurality of users (e.g. 151, 152 . . . 159) to erase at least one freehand memo (e.g. 130) from a data storage device (e.g. 144).

According to some of the various embodiments, the memo and photo authenticating method may comprise prompting and/or responding to a user command from at least one of a plurality of users (e.g. 151, 152 . . . 159) to erase an image taken by at least one of at least one camera (e.g. 120). The memo and photo authenticating method may comprise prompting at least one of a plurality of users (e.g. 151, 152 . . . 159) to view at least one image taken by at least one of at least one camera (e.g. 120). The memo and photo authenticating method may comprise prompting and/or responding to a user command from at least one of a plurality of users (e.g. 151, 152 . . . 159) to save an image taken by at least one of the at least one camera (e.g. 120) to a data storage device (e.g. 144). The memo and photo authenticating method may comprise prompting (and/or responding to a user command from) at least one of a plurality of users (e.g. 151, 152 . . . 159) to erase at least one image from a data storage device (e.g. 144).

According to some of the various embodiments, the memo and photo authenticating method may comprise prompting (and/or responding to a user command from) the at least one user (e.g. 159) to prepare themselves for an image type. The memo and photo authenticating method may comprise displaying a countdown timer for an image capture. The memo and photo authenticating method may comprise accepting vocal commands employing a voice recognition module (e.g. 192). The memo and photo authenticating method may comprise initiating an image capture in response to a user command. The user command may be a vocal command. The user command may be at least one gesture.

According to some of the various embodiments, the memo and photo authenticating method may comprise producing a digital photo album comprising a freehand memo (e.g. 130) and the associated at least one image.

Figure 8:
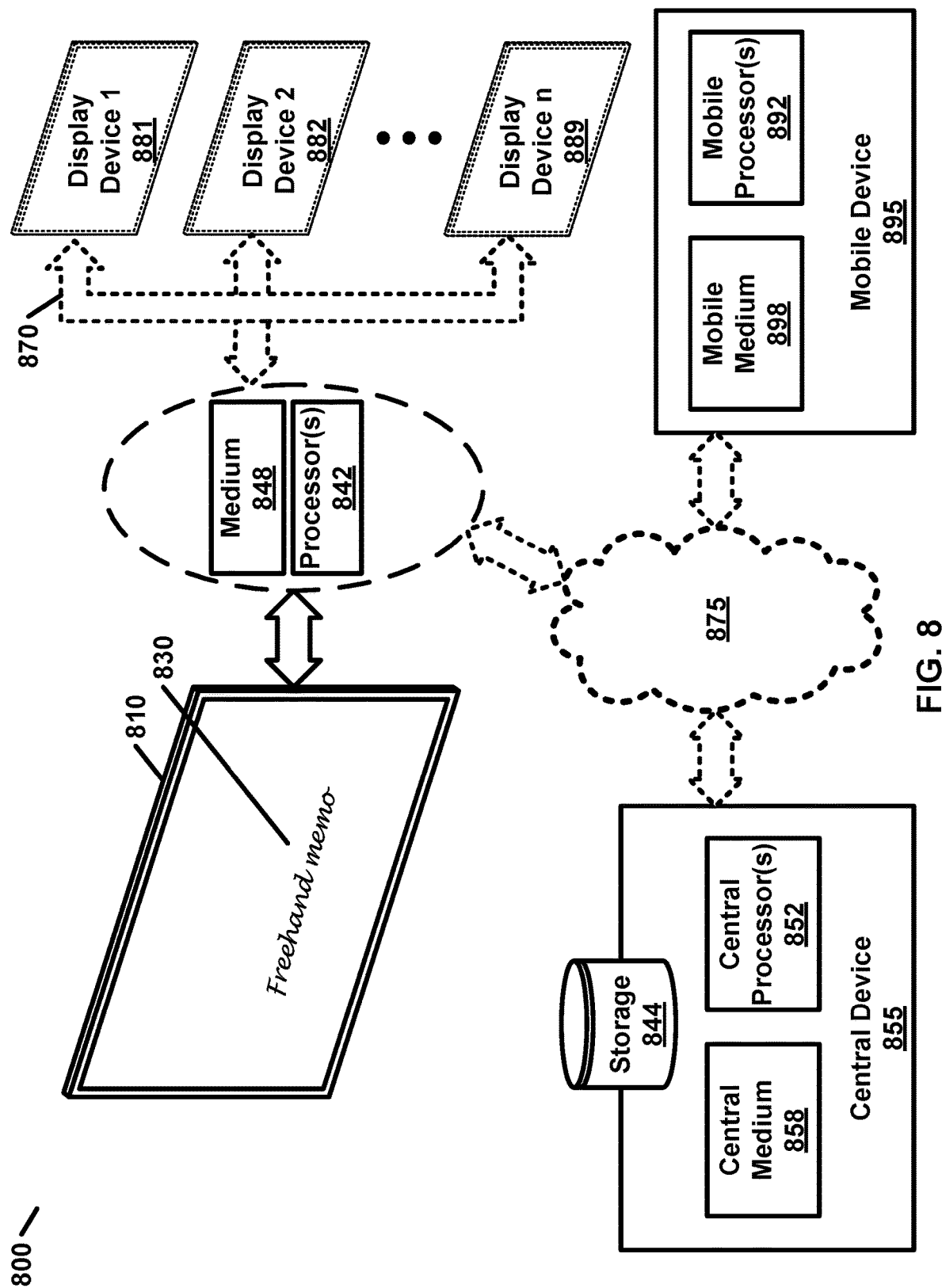
FIG. 8 is an example block diagram showing elements of a memo and photo authenticating system as per an aspect of some of the various embodiments.

FIG. 8 is an example block diagram showing elements of a memo and photo authenticating system 800 comprising at least one multiuser touch input device (e.g. 810), at least one central computing device (e.g. 855), and at least one mobile device (e.g. 895). Each of the at least one multiuser touch input device (e.g. 810) may comprise a non-transitory tangible machine readable medium 848 and at least one processor 842. The non-transitory tangible machine readable medium 848 may comprise instructions configured to cause the at least one processor 842 to communicate with a data storage device 844. The data storage device 844 may be collocated with at least one central computing device (e.g. 855). The data storage device 844 may be distributed among a plurality of central computing devices. At least one processor 842 may be configured to communicate with at least one central computing device (e.g. 855) through employment of a network (e.g. 875). Network 875 may comprise at least part of: an intranet, the Internet, a cellular network, a hardwired network, a wireless network, combinations thereof, and/or the like. The instructions may be configured to cause the at least one processor 842 to capture a freehand memo 830. The freehand memo 830 may be captured employing one of at least one multiuser touch input device 810. The instructions may be configured to cause at least one processor 842 to communicate the freehand memo 830 to the data storage device 844. The instructions may be configured to cause at least one processor 842 to capture at least one image of at least one user. The instructions may be configured to cause at least one processor 842 to communicate at least one image to a data storage device 844. The instructions may be configured to cause at least one processor 842 to associate the freehand memo 830 with at least one image of at least one user in the data storage device 144.

At least one central computing device (e.g. 855) may comprise a non-transitory tangible machine readable central medium 858 and at least one central processor 852. The non-transitory tangible machine readable central medium 858 may comprise instructions configured to cause at least one central processor 852 to communicate with a data storage device 844. At least one central processor 852 may be configured to communicate with a data storage device 844 through employment of a network (e.g. 875).

Each of the at least one mobile device (e.g. 895) may comprise a non-transitory tangible machine readable mobile medium 898 and at least one mobile processor 892. The non-transitory tangible machine readable mobile medium 898 may comprise instructions configured to cause at least one mobile processor 892 to communicate with the data storage device 844. At least one mobile processor 892 may be configured to communicate with at least one central computing device (e.g. 855) through employment of a network (e.g. 875).

The memo and photo authenticating system 800 may comprise at least one display device (e.g. 881, 882 . . . 889). Each of the at least one display device (e.g. 881, 882 . . . 889) may be configured to receive presentation instructions through employment of network(s) (e.g. 870 and/or network 875). The presentation instructions may originate from at least one of at least one processor 842, at least one of at least one central processor 852, at least one of at least one mobile processor 892, combinations thereof, and/or the like. The presentation instructions may comprise images and/or freehand memos captured by guests, remote guests, users, photographers, advertisers, combinations thereof, and/or the like.

Figure 9:
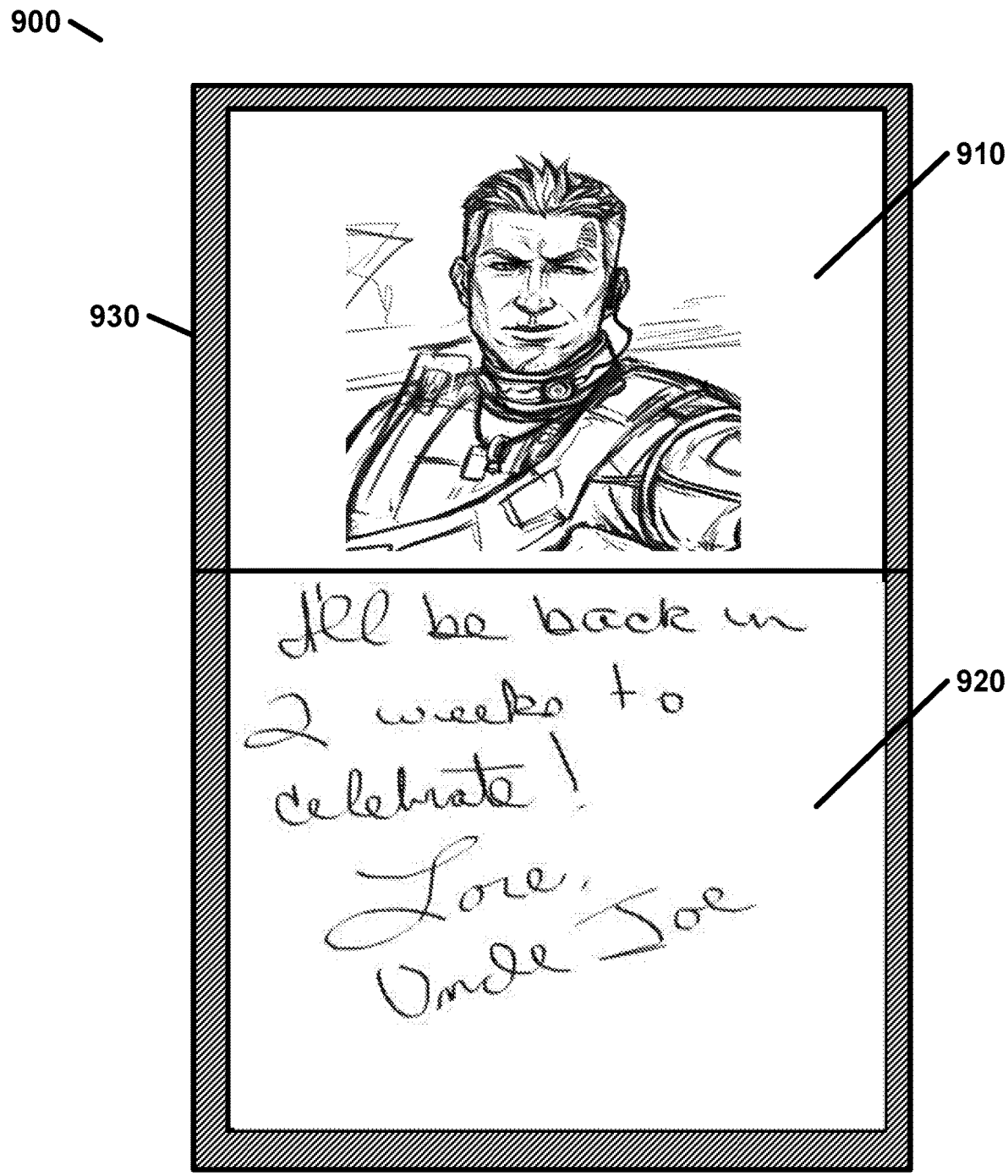
FIG. 9 is an example diagram of a public freehand memo authenticated with an image as per an aspect of some of the various embodiments.

FIG. 9 is an example diagram of a public freehand memo authenticated with an image 900 comprising one of at least one image 910 of at least one remote guest and a freehand memo 920 associated with at least one image 910. This freehand memo authenticated with an image 900 is an example of a remote guest who may have viewed an image (e.g. 520) on the at least one mobile device (e.g. 895) and acted independently on a prompt (e.g. 530) to leave a freehand memo 920. At least one image 910 and/or the freehand memo 920 may be associated with at least one graphical element 930.

According to some of the various embodiments, at least one of at least one remote guest may employ one of at least one mobile device (e.g. 895) to capture the freehand memo 920 and at least one image 910. A non-transitory tangible machine readable mobile medium (e.g. 898) may comprise mobile instructions configured to cause at least one mobile processor (e.g. 892) to capture the freehand memo 920 employing one of at least one mobile device (e.g. 895). The freehand memo 920 may comprise a screenshot from a touch input device of one of at least one mobile device (e.g. 895). The touch input device of one of at least one mobile device (e.g. 895) may be configured to trace and store hand, finger, and/or stylus movements by at least one of at least one remote guest. The mobile instructions may be configured to cause one of at least one mobile processor (e.g. 892) to communicate the freehand memo to the data storage device (e.g. 844). The mobile instructions may be configured to cause at least one mobile processor (e.g. 892) to capture at least one image 910 of at least one of at least one remote guest employing at least one mobile camera collocated with one of at least one mobile device (e.g. 895). The mobile instructions may be configured to cause at least one mobile processor (e.g. 892) to communicate at least one image 910 to a data storage device (e.g. 844). The mobile instructions may be configured to cause at least one mobile processor (e.g. 892) to associate the freehand memo 920 with at least one image 910 of at least one of at least one remote guest in a data storage device (e.g. 844).

According to some of the various embodiments, at least one of the display device(s) (e.g. 881, 882 . . . 889) may be configured to present images and/or freehand memos captured by at least one remote guest through employment of at least one mobile device (e.g. 895). The freehand memo (e.g. 920) and at least one image (e.g. 910) captured by at least one mobile device (e.g. 895) may be presented with at least one graphical element (e.g. 930) distinct from images and/or freehand memos (e.g. 830) captured by at least one multiuser touch input device (e.g. 810) and/or the event photographer. For example, freehand memos captured by at least one remote guest may comprise a border, a distinct border type, a distinct border color, a user name, combinations thereof, and/or the like.

According to some of the various embodiments, the mobile instructions may be configured to cause at least one mobile processor (e.g. 892) to capture at least one image 910 of at least one of at least one remote guest through employment of at least one mobile camera associated with one of at least one mobile device (e.g. 895). At least one image 910 may be captured before, during, or after the freehand memo 920 is written by at least one of at least one remote guest. At least one image 910 may comprise at least one video.

According to some of the various embodiments, mobile instructions may be configured to cause at least one mobile processor (e.g. 892) to require an event code from one of at least one remote guest. The event code may be required to enable capture of freehand memo 920 and/or capture of at least one image 910. The event code may be required to enable presentation of freehand memo(s) (e.g. 830) and image(s) during an event associated with the event code. Presentation of freehand memos with a resolution and/or size distinct from a resolution and/or size of a display associated with a mobile device (e.g. 895) may be viewed in part. The mobile instructions may be configured to cause at least one mobile processor (e.g. 892) to accept swipe commands, gestures, or voice commands (e.g. up, down, left, right) to view remaining portion(s) of freehand memos. Presentation of a plurality of images associated with a freehand memo may be viewed one at a time. The mobile instructions may be configured to cause at least one mobile processor (e.g. 892) to accept swipe commands, gestures, or voice commands (e.g. up, down, left, right) to view additional images associated with a freehand memo. The mobile instructions may be configured to cause at least one mobile processor (e.g. 892) to enable access to a user account for one of at least one remote guest. The mobile instructions may be configured to cause the at least one mobile processor 892 to accept at least one biometric input, at least one gesture, at least one voice command, combinations thereof, and/or the like from at least one of the at least one remote guest.

According to some of the various embodiments, the mobile instructions may be configured to cause the at least one mobile processor 892 to prompt the at least one of at least one remote guest to prepare themselves for an image type. The mobile instructions may be further configured to cause at least one mobile processor (e.g. 892) to initiate an image capture in response to a user command. The mobile instructions may be configured to cause at least one mobile processor (e.g. 892) to present at least one confirmation message.

According to some of the various embodiments, the mobile instructions may be configured to cause at least one mobile processor (e.g. 892) to prompt a user, guest, and/or remote guest to mark a freehand memo as private. The mobile instructions may be configured to cause at least one mobile processor (e.g. 892) to prompt a user, guest, and/or remote guest to send a private freehand memo to at least one other user, guest, and/or remote guest. Guests and/or remote guests not registered as users may receive an invitation to become a user. The invitation to become a user may be received along with a link to the private freehand memo. Guests and/or remote guests not registered as users may receive the invitation and/or link to the private freehand memo through employment of an email address, a phone number, a short message service, a multimedia messaging service, a social media service, combinations thereof, and/or the like.

Figure 10:
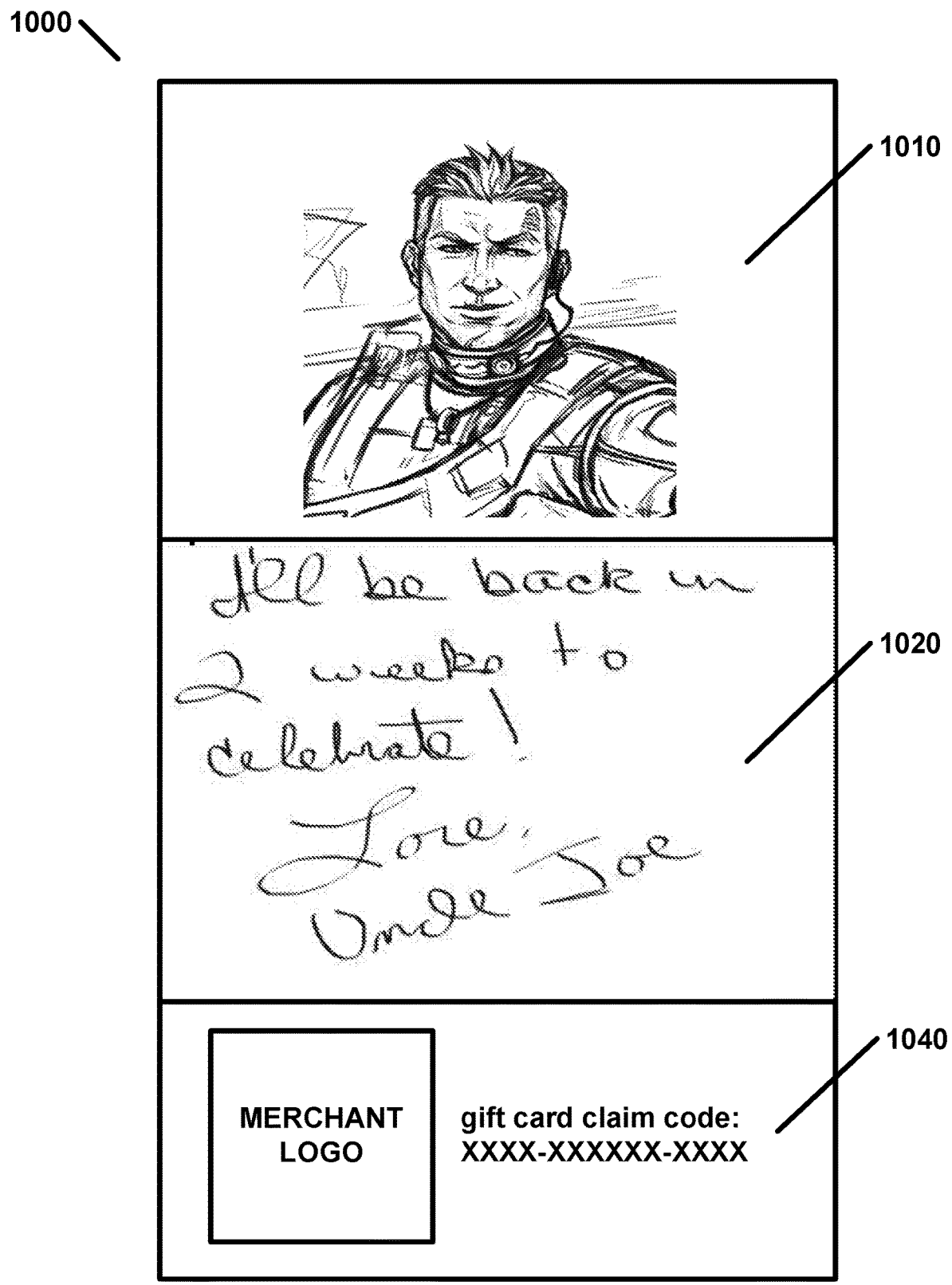
FIG. 10 is an example diagram of a private freehand memo authenticated with an image as per an aspect of some of the various embodiments.

FIG. 10 is an example diagram of a private freehand memo authenticated with an image 1000 comprising one of at least one image 1010 of at least one remote guest, a freehand memo 1020 associated with at least one image 1010, and a gift 1040. The gift 1040 may comprise, for example, a digital gift card, a purchase confirmation, an action for the intended recipient of the private freehand memo, combinations thereof, and/or the like. The digital gift card may comprise a barcode, a two-dimensional barcode, a QR code, an alphanumeric code, combinations thereof, and/or the like. The purchase confirmation may be associated with an item from a gift or wedding registry. The private freehand memo authenticated with an image 1000 may be associated with a public freehand memo authenticated with an image (e.g. 900). The private freehand memo authenticated with an image 1000 may be configured for viewing by the recipient of the private freehand memo through employment of a user account associated with the recipient. The private freehand memo authenticated with an image 1000 may be stored in a photo album associated with the user account of the recipient. The private freehand memo authenticated with an image 1000 may be stored with the gift 1040. The public freehand memo authenticated with an image (e.g. 900) may be configured for presentation on at least one multiuser touch input device (e.g. 810), on at least one of the display device(s) (e.g. 881, 882 . . . 889), in a photo album associated with an event, on a display of at least one mobile device associated with one of at least one remote guest, on at least one webpage, combinations thereof, and/or the like.

According to some of the various embodiments, the mobile instructions may be configured to cause at least one mobile processor (e.g. 892) to prompt at least one of at least one remote guest to add a gift 1040 to a freehand memo 1020. The gift may be purchased through employment of at least one user account, at least one merchant, at least one shipping carrier, combinations thereof, and/or the like. The mobile instructions may be configured to cause at least one mobile processor (e.g. 892) to accept partial payments for at least one gift from each of a plurality of user accounts. The mobile instructions may be configured to cause at least one mobile processor (e.g. 892) to accept a payment for the gift 1040. The payment may employ a payment method associated with the user account of one of the at least one remote guest. The mobile instructions may be configured to receive a barcode, a two-dimensional barcode, a QR code, an alphanumeric code, combinations thereof, and/or the like from a merchant, a merchant exchange carrier, a gift card provider, combinations thereof, and/or the like. The mobile instructions may be configured to cause at least one mobile processor (e.g. 892) to mark the freehand memo 1020 as private when the gift 1040 is added.

According to some of the various embodiments, mobile instructions may be configured to cause at least one mobile processor (e.g. 892) to present the digital photo album comprising freehand memo(s) (e.g. 620, 720 and 920) and associated images (e.g. 610, 710 and 910). The digital photo album may be associated with an event code. The event code may be employed to search for a digital photo album associated with an event. The mobile instructions may be configured to cause at least one mobile processor (e.g. 892) to present a history of digital photo albums, a history of freehand memos sent, a history of freehand memos received, a history of events, combinations thereof, and/or the like. The mobile instructions may be configured to cause at least one mobile processor (e.g. 892) to search a history for a digital photo album, a freehand memo sent, a freehand memo received, an event, combinations thereof, and/or the like. The search may be based at least in part on an event name, an event code, a digital photo album name, a name of at least one user, combinations thereof, and/or the like. The mobile instructions may be configured to cause at least one mobile processor (e.g. 892) to enable a user to create digital photo albums from private freehand memos received.

According to some of the various embodiments, mobile instructions may be configured to cause at least one mobile processor (e.g. 892) to prompt a user for at least one vote. At least one vote may be based, at least in part, on at least one digital photo album, at least one freehand memo, at least one image, combinations thereof, and/or the like. Results of the at least one vote may be associated with at the least one digital photo album. Results of the at least one vote may be stored in the date storage device 144. Presentation of the at least one digital photo album may be based, at least in part, on the results of the at least one vote. For example, in a digital photo album comprising a plurality of freehand memos, freehand memos with a higher number of votes may be presented prior to the presentation of freehand memos with a lower number of votes.

Figure 11:
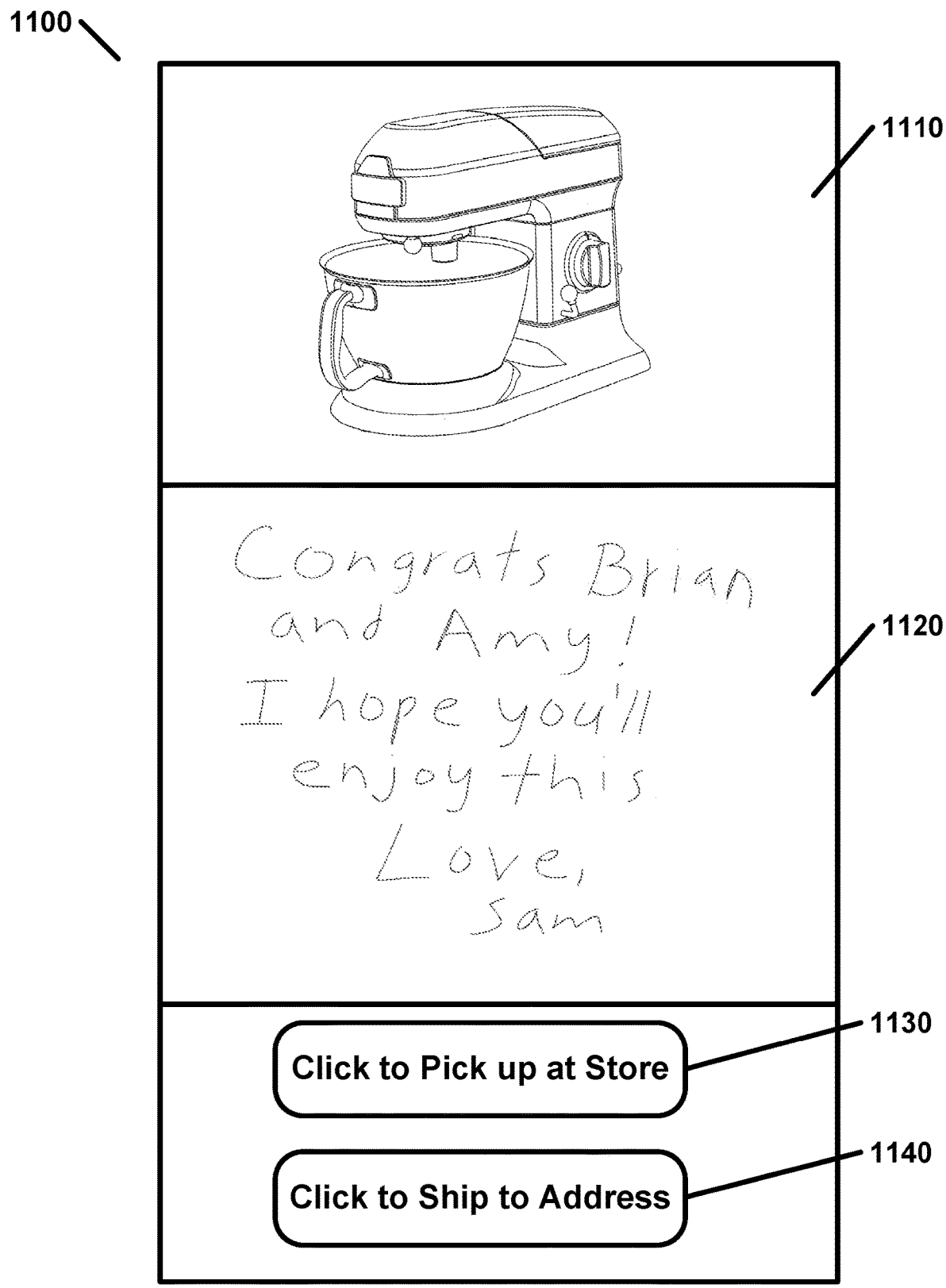
FIG. 11 is an example diagram of a private freehand memo authenticated with a purchase confirmation as per an aspect of some of the various embodiments.

FIG. 11 is an example diagram of a private freehand memo authenticated with a purchase confirmation 1100 comprising one of at least one gift image 1110, a freehand memo 1120 associated with the one of at least one gift image 1110, and at least one action. The purchase confirmation may comprise the one of at least one gift image 1110. The purchase confirmation may comprise the at least one action. At least one action may, for example, comprise a store pick up option 1130 and/or a shipping option 1140. The purchase confirmation may comprise a tracking number associated a purchase of at least one gift.

Figure 12:
FIG. 12 is an example diagram of a public freehand memo authenticated with an image as per an aspect of some of the various embodiments.
Figure 12:
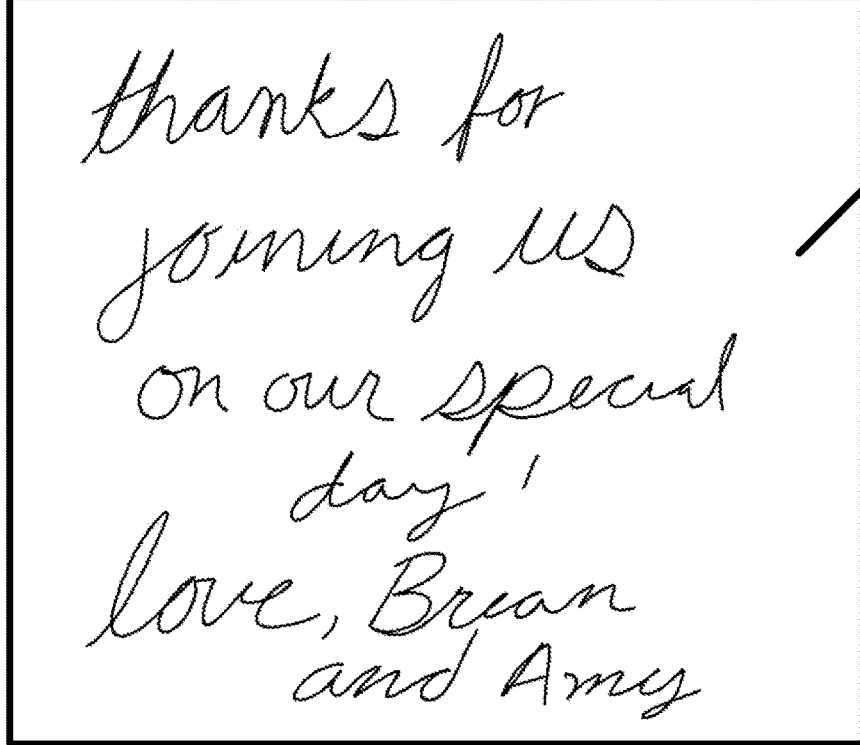

FIG. 12 is an example diagram of a public freehand memo authenticated with an image 1200 comprising one of at least one image 1210 of at least one user and a freehand memo 1220 associated with at least one image 1210. This freehand memo authenticated with an image 1200 is an example of a thank you freehand memo sent by the host of an event to at least one guest. The freehand memo authenticated with an image 1200 may be sent to at least one remote guest. The freehand memo authenticated with an image 1200 may be stored in a digital photo album associated with a user account, a plurality of user accounts, an event code, combinations thereof, and/or the like.

Figure 13:
FIG. 13 is an example diagram of a private freehand memo authenticated with a gift card as per an aspect of some of the various embodiments.

FIG. 13 is an example diagram of a private freehand memo authenticated with a gift card 1300 comprising a freehand memo 1320 and a gift card 1340. The gift card 1340 may comprise a QR code 1330. The QR code 1330 may be employed to apply the gift card 1340 to at least one purchase.

According to some of the various embodiments, the mobile instructions may be configured to cause at least one mobile processor (e.g. 892) to prompt a recipient of a freehand memo to send a thank you freehand memo (e.g. 1220) to the sender of the freehand memo. The prompt may be configured to present at least one choice to the recipient. At least one choice may comprise: send a thank you freehand memo now, send a thank you freehand memo later, do not send a thank you freehand memo, add a gift, combinations thereof, and/or the like.

According to some of the various embodiments, a non-transitory tangible machine readable central medium (e.g. 858) may comprise central instructions configured to cause at least one central processor (e.g. 852) to communicate with a website configured to require an event code from one of the at least one remote guest. The event code may be required to enable presentation of freehand memo(s) (e.g. 830) and image(s) during an event associated with the event code. Presentation of freehand memos with a resolution and/or size distinct from a resolution and/or size of a display employed to access the website may be viewed in part. The central instructions may be configured to cause at least one central processor (e.g. 852) to communicate with a web site configured to accept swipe commands, gestures, or voice commands (e.g. up, down, left, right) to view remaining portion(s) of freehand memos. Presentation of a plurality of images associated with a freehand memo may be viewed one at a time. The central instructions may be configured to cause at least one central processor (e.g. 852) to communicate with a website configured to accept swipe commands, gestures, or voice commands (e.g. up, down, left, right) to view additional images associated with a freehand memo. The central instructions may be configured to cause at least one central processor (e.g. 852) to communicate with a website configured to enable access to a user account for one of at least one remote guest. The central instructions may be configured to cause at least one central processor (e.g. 852) to communicate with a web site configured to accept at least one biometric input, at least one gesture, at least one voice command, combinations thereof, and/or the like from at least one of the at least one remote guest.

According to some of the various embodiments, the central instructions may be configured to cause at least one central processor (e.g. 852) to communicate with a website configured to present a digital photo album comprising freehand memo(s) (e.g. 620, 720 and 920) and associated images (e.g. 610, 710 and 910). The digital photo album may be associated with an event code. The event code may be employed to search for a digital photo album associated with an event. The central instructions may be configured to cause at least one central processor (e.g. 852) to communicate with a website configured to present a history of digital photo albums, a history of freehand memos sent, a history of freehand memos received, a history of events, combinations thereof, and/or the like. The central instructions may be configured to cause at least one central processor (e.g. 852) to search a history for a digital photo album, a freehand memo sent, a freehand memo received, an event, combinations thereof, and/or the like. The search may be based at least in part on an event name, an event code, a digital photo album name, a name of at least one user, combinations thereof, and/or the like. The central instructions may be configured to cause at least one central processor (e.g. 852) to enable a user to create digital photo albums from private freehand memos received.

According to some of the various embodiments, the central instructions may be configured to cause at least one central processor (e.g. 852) to accept creation of user accounts. Request for user accounts may originate from one of at least one mobile device (e.g. 895), the website in communication with at least one central computing device (e.g. 855), one of at least one multiuser touch input device (e.g. 810), combinations thereof, and/or the like. The central instructions may be configured to cause at least one central processor (e.g. 852) to communicate the freehand memo (e.g. 920) and at least one image (e.g. 910) from the user account associated with at least one of the at least one remote guest captured in at least one image (e.g. 910) with a user account of at least one additional user.

According to some of the various embodiments, the central instructions may be configured to cause at least one central processor (e.g. 852) to communicate with a website configured to accept creation of events. The central instructions may be configured to cause at least one central processor (e.g. 852) to communicate with a website configured to accept creation of at least one invitation for an event. At least one invitation may be sent to at least one user, at least one guest, at least one remote guest, at least one group, combinations thereof, and/or the like. At least one invitation may comprise an event code. The central instructions may be configured to cause at least one central processor (e.g. 852) to communicate with a website configured to associate a gift registry with an event.

According to some of the various embodiments, the central instructions may be configured to cause at least one central processor (e.g. 852) to communicate with a website configured to accept submission of at least one freehand memo. At least one freehand memo may be captured through employment of at least one mobile device (e.g. 895). The central instructions may be configured to cause at least one central processor (e.g. 852) to store at least one freehand memo in a data storage device (e.g. 144). The central instructions may be configured to cause at least one central processor (e.g. 852) to communicate with a website configured to accept submission of at least one image. At least one image may be captured through employment of at least one mobile device (e.g. 895). The central instructions may be configured to cause at least one central processor (e.g. 852) to store at least one image in a data storage device (e.g. 144). The central instructions may be configured to cause at least one central processor (e.g. 852) to associate each of at least one freehand memo with at least one of at least one image in the data storage device (e.g. 144).

According to some of the various embodiments, the central instructions may be configured to cause at least one central processor (e.g. 852) to prompt a user for at least one vote. At least one vote may be based, at least in part, on at least one digital photo album, at least one freehand memo, at least one image, combinations thereof, and/or the like. Results of the at least one vote may be associated with at least one digital photo album. Results of the at least one vote may be stored in a date storage device (e.g. 144). Presentation of the at least one digital photo album may be based, at least in part, on the results of the at least one vote.

Figure 14:
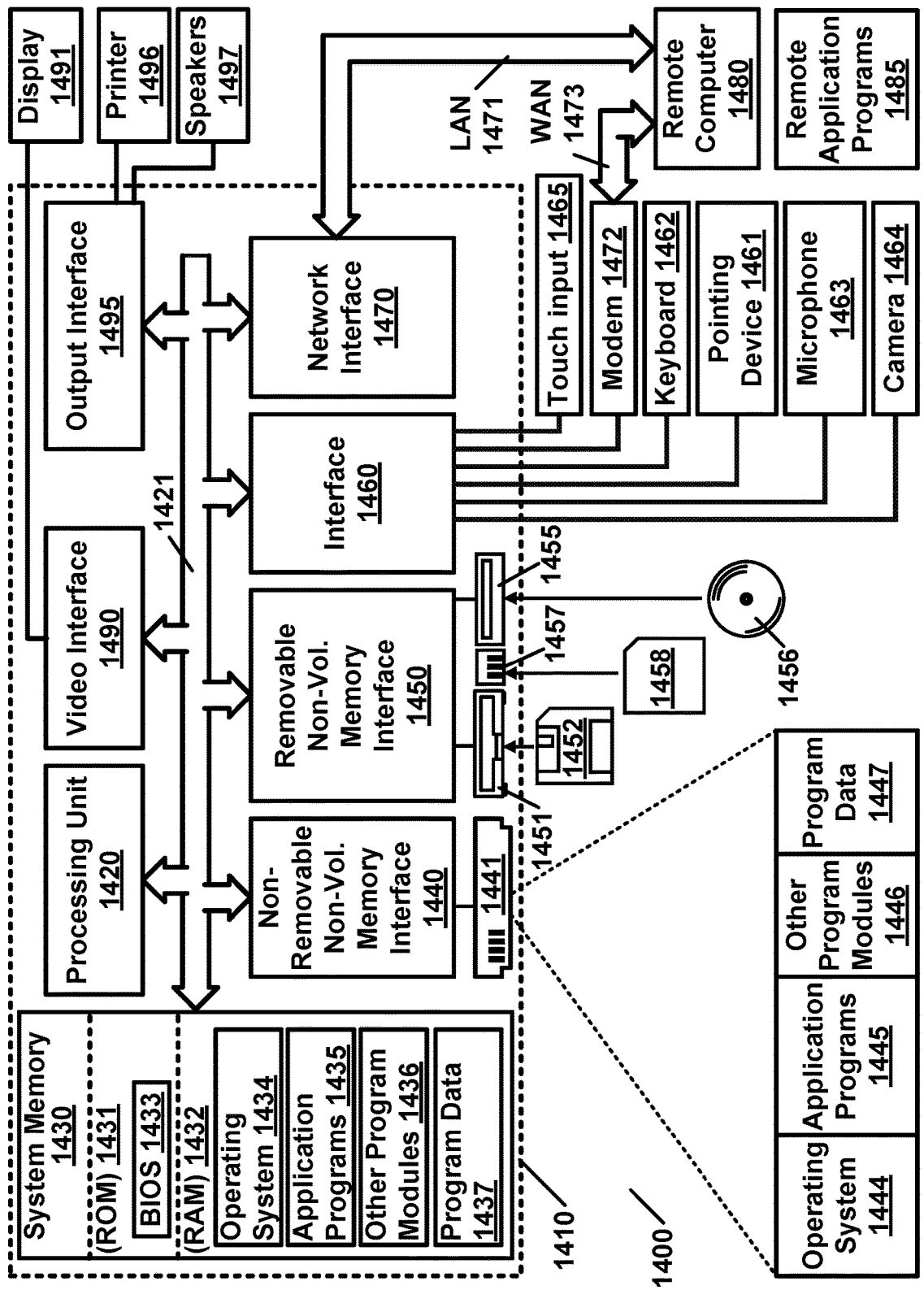
FIG. 14 is a block diagram of a computing environment in which aspects of embodiments of the present invention may be practiced.

FIG. 14 illustrates an example system for implementing at least some embodiments and comprises a general-purpose computing device in the form of a computing device 1410. Components of computing device 1410 may include, but are not limited to, a processing unit 1420, a system memory 1430, and a system bus 1421 that couples various system components including the system memory 1430 to the processing unit 1420.

Computing device 1410 may comprise a variety of computer readable media. Computer readable media may be any available media that may be accessed by computing device 1410 and may include both volatile and nonvolatile media, removable and non-removable media. By way of example, and not limitation, computer readable media may comprise computer storage media and communication media. Computer storage media may comprise both volatile and non-volatile, removable and non-removable media implemented in a method or technology for storage of information such as computer readable instructions, data structures, program modules, other data, combinations thereof, and/or the like. Computer storage media may comprise, but is not limited to, random access memory (RAM), read-only memory (ROM), electrically erasable programmable read-only memory (EE-PROM), flash memory or other memory technology, compact disc read-only memory (CD-ROM), digital versatile disks (DVD) or other optical disk storage, magnetic cassettes, magnetic tape, magnetic disk storage or other magnetic storage devices, and/or any other medium which may be employed to store information and which may be accessed by computer 1410. Communication media may comprise computer readable instructions, data structures, program modules and/or other data in a modulated data signal such as a carrier wave and/or other transport mechanism and may comprise information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above may also be included within the scope of computer readable media.

The system memory 1430 may comprise computer storage media in the form of volatile and/or nonvolatile memory such as ROM 1431 and RAM 1432. A basic input/output system 1433 (BIOS), containing the basic routines that help to transfer information between elements within computer 1410, such as during start-up, may be stored in ROM 1431. RAM 1432 may comprise data and/or program modules that may be accessible to and/or presently being operated on by processing unit 1420. By way of example, and not limitation, FIG. 14 illustrates operating system 1434, application programs 1435, other program modules 1436, and program data 1437.

The computing device 1410 may also comprise other removable/non-removable volatile/nonvolatile computer storage media. By way of example only, FIG. 14 illustrates a hard disk drive 1441 that may read from or write to non-removable, nonvolatile magnetic media, a magnetic disk drive 1451 that may read from or write to a removable, nonvolatile magnetic disk 1452, a flash drive reader 1457 that may read flash drive 1458, and an optical disk drive 1455 that may read from or write to a removable, nonvolatile optical disk 1456 such as a CD ROM or other optical media. Other removable/non-removable, volatile/nonvolatile computer storage media that may be used in the operating environment include, but are not limited to, magnetic tape cassettes, flash memory cards, digital versatile disks, digital video tape, solid state RAM, solid state ROM, and the like. The hard disk drive 1441 may be connected to the system bus 1421 through a non-removable memory interface such as interface 1440, and magnetic disk drive 1451 and optical disk drive 1455 may be connected to the system bus 1421 by a removable memory interface, such as interface 1450.

The drives and their associated computer storage media discussed above and illustrated in FIG. 14 provide storage of computer readable instructions, data structures, program modules and other data for the computer 1410. In FIG. 14, for example, hard disk drive 1441 is illustrated as storing operating system 1444, application programs 1445, program data 1447, and other program modules 1446. Additionally, for example, non-volatile memory may include instructions for presenting images on a display 1491 of computing device 1400 and/or the like. Similarly, non-volatile memory may comprise instructions for causing the presentation of images on the display of a remote computing device 1480 and/or the like. Display 1491 and touch input 1465 may be integrated into the same device.

A user may enter commands and information into computing device 1410 through input devices such as a touch input device 1465, a keyboard 1462, a microphone 1463, a camera 1464, and a pointing device 1461, such as a mouse, trackball or touch pad. These and other input devices may be connected to the processing unit 1420 through a input interface 1460 coupled to system bus 1421, but may be connected by other interface and bus structures, such as a parallel port, game port or a universal serial bus (USB). A display 1491 or other type of display device may be connected to the system bus 1421 via an interface, such as a video interface 1490. Other devices, such as, for example, speakers 1497 and printer 1496 may be connected to the system via output interface 1495.

The computing device 1410 may be operated in a networked environment using logical connections to one or more remote computers, such as a remote computer 1480. Remote computer 1480 may be a personal computer, a hand-held device, a server, a router, a network PC, a peer device or other common network node, and typically includes many or all of the elements described above relative to the computing device 1410. The logical connections depicted in FIG. 14 include a local area network (LAN) 1471 and a wide area network (WAN) 1473, but may also include other networks. Such networking environments are commonplace in offices, enterprise-wide computer networks, intranets and the Internet.

When used in a LAN networking environment, the computing device 1410 is connected to the LAN 1471 through a network interface or adapter 1470. When used in a WAN networking environment, the computing device 1410 may comprise a modem 1472 or other means for establishing communications over the WAN 1473, such as the Internet. The modem 1472, which may be internal or external, may be connected to the system bus 1481 via interface 1460, or other appropriate mechanism. The modem 1472 may be wired or wireless. Examples of wireless devices may comprise, but are not limited to: Wi-Fi and Bluetooth. In a networked environment, program modules depicted relative to the computing device 1410, or portions thereof, may be stored in the remote memory storage device. By way of example, and not limitation, FIG. 14 illustrates remote application programs 1485 as residing on remote computer 1480. It will be appreciated that the network connections shown are presented as examples only and other means of establishing a communications link between the computers may be used.

Although the subject matter has been described in language specific to system features and/or instructions, it is to be understood that the subject matter defined in the appended claims is not necessarily limited to the specific features or instructions described above. Rather, the specific features and instructions described above are disclosed as example forms of implementing the claims.

In this specification, "a" and "an" and similar phrases are to be interpreted as "at least one" and "one or more." References to "an" embodiment in this disclosure are not necessarily to the same embodiment.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e. hardware with a biological element) or a combination thereof, all of which are behaviorally equivalent. For example, modules may be implemented using computer hardware in combination with software routine(s) written in a computer language (Java, HTML, XML, PHP, Python, ActionScript, JavaScript, Ruby, Prolog, SQL, VBScript, Visual Basic, Perl, C, C++, Objective-C or the like). Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs), field programmable gate arrays (FPGAs), and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

Some embodiments may employ processing hardware. Processing hardware may include one or more processors, computer equipment, embedded system, machines and/or the like. The processing hardware may be configured to execute instructions. The instructions may be stored on a machine-readable medium. According to some embodiments, the machine-readable medium (e.g. automated data medium) may be a medium configured to store data in a machine-readable format that may be accessed by an automated sensing device. Examples of machine-readable media include: magnetic disks, cards, tapes, and drums, flash memory, memory cards, electrically erasable programmable read-only memory (EEPROM), solid state drives, optical disks, barcodes, magnetic ink characters, and/or the like.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, systems have been described as including at least one processor. However, one skilled in the art will recognize that the at least one processor may be distributed among at least one server and at least one client device. At least one server and at least one client device may vary from traditional server/device relationships over a network such as the internet. For example, a server may be collective based: portable equipment, broadcast equipment, virtual, application(s) distributed over a broad combination of computing sources, part of a cloud, and/or the like. Similarly, for example, a client device may be a user based client, portable equipment, broadcast equipment, virtual, application(s) distributed over a broad combination of computing sources, part of a cloud, and/or the like. Additionally, it should be noted that, for example purposes, several of the various embodiments were described as processes. However, one skilled in the art will recognize that many various languages and frameworks may be employed to build and use embodiments of the present invention. For example, languages/frameworks may be based upon Java, HTML, XML, PHP, Python, ActionScript, JavaScript, Ruby, Prolog, SQL, VBScript, Visual Basic, Perl, C, C++, Objective-C combinations thereof, and/or the like.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A memo and photo authentication system comprising:
   a) a multiuser touch input device configured for touch input by a plurality of users;
   b) at least one camera communicatively coupled to the multiuser touch input device;
   c) at least one processor; and
   d) a non-transitory tangible machine readable medium comprising instructions configured to cause the at least one processor to:
      i) prompt the plurality of users to write a freehand memo on the multiuser touch input device;
      ii) capture the freehand memo from the plurality of users employing the multiuser touch input device, the freehand memo addressed to a recipient other than the plurality of users;
      iii) store the freehand memo in a data storage device;
      iv) prompt the plurality of users to prepare for an image capture;
      v) capture at least one image of the plurality of users employing the at least one camera;
      vi) store the at least one image in the data storage device; and
      vii) associate the freehand memo with the at least one image of the plurality of users in the data storage device; and
   whereby the freehand memo is authenticated through association with the at least one image of the plurality of users.

2. The system according to claim 1, further comprising a mount configurable to position the multiuser touch input device for multiple user viewing.

3. The system according to claim 1, further comprising at least one remote camera mounted to view the multiuser touch input device.

4. The system according to claim 3, wherein the instructions are further configured to cause the at least one processor to:
   a) capture at least one remote image of the plurality of users employing the at least one remote camera;
   b) store the at least one remote image in the data storage device; and
   c) associate the at least one remote image with the freehand memo in the data storage device.

5. The system according to claim 1, further comprising a communications interface configured to communicate with at least a part of a distribution system comprising a plurality of display devices.

6. The system according to claim 1, wherein the at least one camera is integrated with at least one of the following:
   a) the multiuser touch input device; and
   b) a display device.

7. The system according to claim 1, further comprising a voice recognition module.

8. The system according to claim 1, further comprising a voice synthesis module.

9. The system according to claim 1, wherein the instructions are further configured to cause the at least one processor to produce a digital photo album comprising the freehand memo and the associated at least one image.

10. The system according to claim 1, wherein the at least one image comprises at least one video.

11. The system according to claim 1, further comprising an advertisement module.

12. A memo and photo authenticating method comprising:
   a) prompting a plurality of users to write a freehand memo on a multiuser touch input device configured for touch input by a plurality of users;
   b) capturing the freehand memo from the plurality of users employing the multiuser touch input device, the freehand memo addressed to a recipient other than the plurality of users;
   c) storing the freehand memo, employing at least one processor, in a data storage device;
   d) prompting the plurality of users to prepare for an image capture;
   e) capturing at least one image of the plurality of users employing at least one camera;
   f) storing the at least one image in the data storage device;
   g) associating the freehand memo with the at least one image of the plurality of users in the data storage device; and
   whereby the freehand memo is authenticated through association with the at least one image of the plurality of users.

13. The method according to claim 12, further comprising:
   a) capturing at least one remote image of the plurality of users employing at least one remote camera;
   b) storing the at least one remote image in the data storage device; and
   c) associating the at least one remote image with the freehand memo in the data storage device.

14. The method according to claim 12, further comprising communicating with at least a part of a distribution system comprising a plurality of display devices.

15. The method according to claim 12, wherein the recipient comprises at least one of the following:
  a) an honoree;
  b) a host of a party or event;
  c) a bride;
  d) a groom;
  e) a retiree;
  f) an employee;
  g) a guest of honor;
  h) a patient;
  i) a donor;
  j) a member of a military unit;
  k) a competitor; and
  l) a contestant.

16. The method according to claim 12, further comprising prompting the plurality of users for at least one of the following actions:
  a) erase a freehand memo written on the multiuser touch input device;
  b) view at least one freehand memo written on the multiuser touch input device;
  c) save a freehand memo written on the multiuser touch input device to the data storage device; and
  d) erase at least one freehand memo from the data storage device.

17. The method according to claim 12, further comprising prompting the plurality of users for at least one of the following actions:
  a) erase an image taken by at least one of the at least one camera;
  b) view at least one image taken by at least one of the at least one camera;
  c) save an image taken by at least one of the at least one camera to the data storage device; and
  d) erase at least one image from the data storage device.

18. The method according to claim 12, further comprising prompting the plurality of users to prepare themselves for an image type, the image type comprising at least one of the following:
  a) a sequence of images;
  b) a full body image;
  c) a close up image; and
  d) a funny image.

19. The method according to claim 12, further comprising accepting vocal commands employing a voice recognition module.

20. The method according to claim 12, further comprising producing a digital photo album comprising the freehand memo and the associated at least one image.

21. The method according to claim 12, wherein the at least one remote image comprises at least one remote video.

22. The system according to claim 1, wherein the instructions are further configured to cause the at least one processor to produce a printable photo album comprising the freehand memo and the associated at least one image.

23. The method according to claim 12, further comprising producing a printed photo album comprising the freehand memo and the associated at least one image.

* * * * *